March 21, 1967   J. P. LA POINT   3,309,741
DIE CASTING APPARATUS WITH BENT SPRING MOLD MAINTAINING MEANS
Filed Dec. 16, 1963
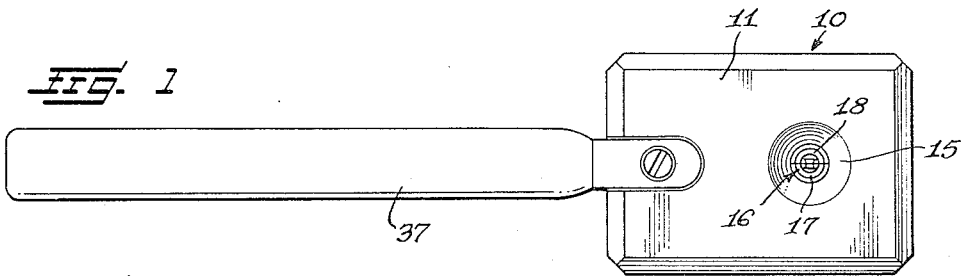
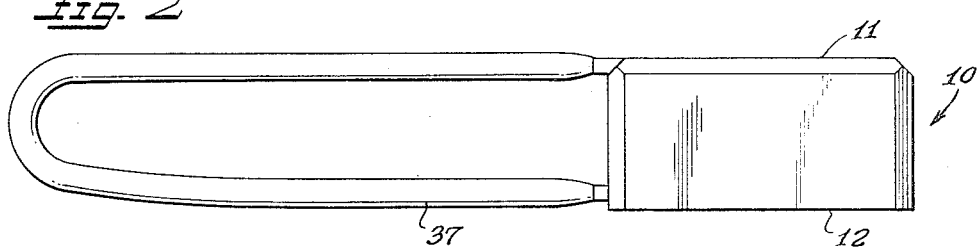
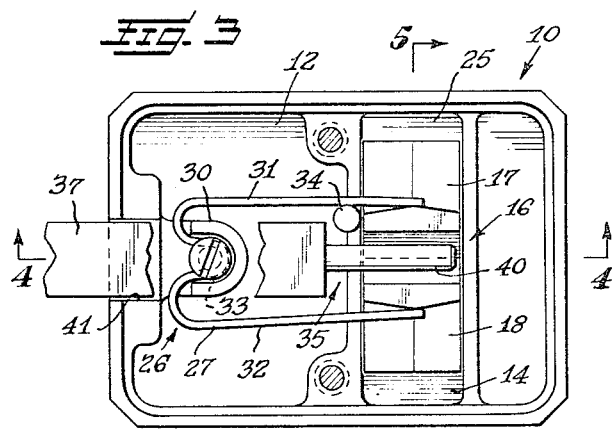
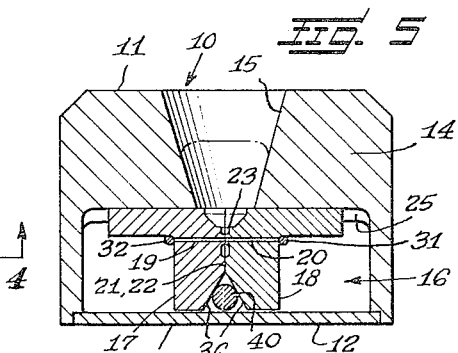
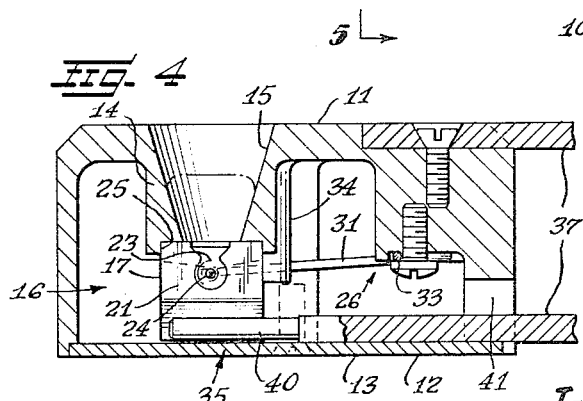
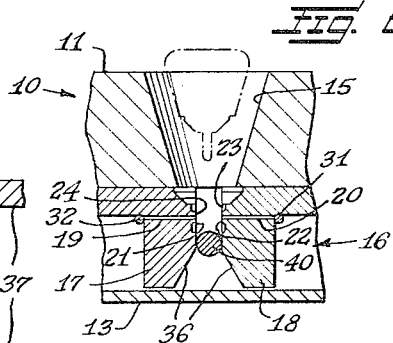
Inventor
James Philip La Point
By Edward L. Amonette
Agent

United States Patent Office 3,309,741
Patented Mar. 21, 1967

3,309,741
DIE CASTING APPARATUS WITH BENT SPRING MOLD MAINTAINING MEANS
James Philip La Point, 613 Georgia SE.,
Albuquerque, N. Mex. 87108
Filed Dec. 16, 1963, Ser. No. 330,873
6 Claims. (Cl. 22—94)

My invention relates generally to molds and more particularly to apparatus for forming a die cast product such as a fishing weight of a type having a solid body portion and an eyelet for attachment to a fishing line.

An object of my invention is the provision of means for die casting a solid product.

Another object of my invention is the provision of means for freeing and ejecting such a product from a split mold.

Another object of my invention is the provision of a mold for forming fishing weights including means for casting an eyelet integral therewith.

Still another object of my invention is the provision of a portable and manually actuable mold for forming fishing weights.

Another object of my invention is the provision of such a mold wherein the size of the weight may be widely varied while using the same apparatus.

Still another object of my invention is the provision of such a mold which is simple to operate and inexpensive to manufacture.

Briefly, these and other objects to become apparent are accomplished in a preferred form of my invention by means of a split mold contained in a small housing. The parting line of the mold is maintained in alignment with a conical opening in the housing by a spring and stop mechanism which also serves to hold the parts of the mold in fluid-tight condition for casting. The conical opening in the housing is used to form the body of a fishing weight while the split mold forms the eyelet. The halves of the split mold are beveled at the parting line to allow a rod-like member to be interposed therebetween in a wedging action. The rod-like member forms one end of a U-shaped, spring-loaded handle which is attached at the other end to the body of the housing. When a casting has been poured and solidified, the operator squeezes the handle thereby wedging the split mold apart and sharply striking the product with the rod-like member to eject the casting out of the apparatus through the conical opening.

A clearer understanding of the details of construction and operation of my invention may be had from the following description, appended claims and accompanying drawing in which:

FIG. 1 is a top plan view of a preferred form of my invention;

FIG. 2 is a side elevational view of the same;

FIG. 3 is an enlarged bottom plan view with certain parts broken away for clarity;

FIG. 4 is a longitiudinal sectional view taken on line 4—4 of FIG. 3;

FIG. 5 is a transverse sectional view taken on line 5—5 of FIG. 3; and

FIG. 6 is a view similar to FIG. 5 showing the parts in another position.

Referring now to the drawings, my invention is shown and described in a preferred embodiment as adapted specifically for hand production of fishing weights of a type having a generally conical body portion and a small eyelet for attachment to a fishing line. In this form a housing 10 comprises the mold for the body portion of a fishing weight and container for the working parts. Housing 10 comprises a box structure having a mold side 11 and an access side 12 closable by a removable cover 13. In a thickened boss portion 14 of mold side 11 is provided a tapered or conical opening 15 for receiving molten material and for forming the body portion of a fishing weight.

Within housing 10 is contained a split mold 16 comprising a pair of identical die members or jaws 17 and 18 having adjacent and abutting surfaces 21 and 22 wherein is formed a mold cavity 23 for formation of the eyelet of the fishing weight. Identical flush center bosses 24 of die members 17 and 18 abut to form the hollow center of the eyelet, the undercut feature necessitating the split or separable mold. Optional relief holes 19 and 20 allow escape of air from cavity 23 through natural surface imperfections of bosses 24 when molten material is poured into the mold. Die members 17 and 18 are movable in a groove 25 in boss 14 toward and away from each other in a straight line perpendicular to the parting line of the mold.

In order to maintain die members 17 and 18 in firmly abutting engagement both with each other and with the base of the groove 25 and to assure central alignment of mold cavity 23 with opening 15, I have provided a spring and stop mechanism designated generally 26. A spring 27 bent as shown in FIG. 3 is secured intermediate its ends to a boss 30 in housing 10. Spring 27 is designed to exert force both upwardly against die members 17 and 18, and inwardly, urging said die members into abutting engagement with one another. Spring segments 31 and 32 are bent from a secured segment 33 in unequal radii whereby unequal tension is imparted to each, segment 31 having the smaller radius and therefore the overriding tension. A stop 34 is arranged to interrupt movement of spring segment 31 at a point designed to place the parting line of mold cavity 23 in centered alignment with opening 15.

To accomplish separation of die members 17 and 18 as desired and for ejecting the die cast product I have provided ejecting means designated generally by the numeral 35. Adjacent die member surfaces 21 and 22 are each provided with a beveled portion 36 which together form a V-shaped notch when the die members are in abutting engagement, as in FIG. 5. A U-shaped handle 37 having its upper end secured to housing 10 and its free lower end spring-urged outwardly is provided at the free end with a rod-like extension 40 which is arranged longitudinally parallel to adjacent die member surfaces 21 and 22. A notch 41 in housing 10 guides and limits movement of extension 40 within the housing 10. With cover 13 in place, extension 40 is held in inactive position in the V-shaped notch. Manual squeezing together of the two sides of handle 37 wedges extension 40 between die members 17 and 18 thereby separating split mold 16. Further sqeezing allows contact of extension 40 with the eyelet formed by mold cavity 23 for ejecting the die cast product through opening 15, as shown clearly in FIG. 6.

Considering now operation of this form of my invention, a fishing weight is cast by pouring molten material such as lead into opening 15 while the die members are held in abutting engagement by spring and stop mechanism 26. Molten material fills mold cavity 23 and as much of conical opening 15 as may be desired, depending upon the desired size of the fishing weight to be formed. Eyelet and body portions of the fishing weight are thereby formed integrally. Thickened boss portion 14 of housing 10 in which opening 15 is located serves as an effective heat sink for rapid solidification of the product. Upon solidification, the product is ejected by brisk manual squeezing together of the handle 37. Sudden lessening of resistance against rod-like extension 40 after die members 17 and 18 are wedged apart provides a considerable striking action of extension 40 against the eyelet and results in popping the fishing weight out of the apparatus.

Release of manually applied pressure on the handle allows return of the die members to abutting engagement by action of spring and stop mechanism 26 whereupon the apparatus is readied for a new pour. Size and weight of the product may be varied as desired within a maximum determined by the size of the opening 15 and a minimum roughly equal to the capacity of the mold cavity formed by die members 17 and 18.

It should be apparent that my construction of a split mold and means for ejecting a die cast product therefrom are applicable to the formation of many die cast products other than fishing weights. Almost any shape formable by a simple split mold utilizing simultaneously separable die members may be produced by equivalents of my construction. While I have described the salient features of my invention in terms of an apparatus for forming fishing weights I do not wish to limit its application solely thereto.

I have described a die casting apparatus which accomplished the objects herein stated and implied. Although this has been done in some particularity it is understood that this is only by way of example and that numerous modifications may be made thereto without departing from the spirit and scope of my invention as hereinafter set forth in claims.

I claim as my invention:
1. Apparatus for forming a die cast product comprising:
 a housing having included in a wall thereof an opening for pouring and ejecting a casting;
 a pair of die members, including jaws having a portion of adjacent surfaces thereof beveled to form a V-shaped notch at the parting line therebetween when said jaws are in abutting engagement, contained and guided in said housing and being movable toward and away from each other in a straight line, said die members forming a mold cavity on their adjacent surfaces when held in abutting engagement, said mold cavity being aligned with said opening in said housing;
 means for maintaining said die members in abutting engagement and for maintaining said mold cavity in alignment with said opening including a stop and a bent spring secured intermediate its ends to said housing and having two free segments of unequal tension each engaging one of said jaws to urge abutting engagement therebetween, the segment thereof having the greater tension being arranged to rest against the stop when said jaws are abutting and said parting line is in alignment with said opening;
 and means interposable between said die members for moving said die members out of abutting engagement and for ejecting a die cast product from said mold cavity through said opening.

2. The die casting apparatus of claim 1 wherein said moving and ejecting means comprises:
 a rodlike member arranged longitudinally parallel said abutting surfaces and movable in and out of wedging engagement with said notch for wedging said jaws out of abutting engagement and being further movable toward said mold cavity for contacting and ejecting a die cast product therefrom and through said opening.

3. Apparatus for forming fishing weights comprising:
 a housing having included in a thickened portion of a wall thereof an opening for receiving molten material therethrough and for forming the body portion of a fishing weight;
 a split mold contained in said housing having a parting line in alignment with said opening, said mold being adapted to form an eyelet of said fishing weight integral therewith and including jaws having a portion of adjacent surfaces thereof beveled to form a V-shaped notch at the parting line therebetween when said jaws are in abutting engagement;
 a bent spring, secured intermediate its ends to said housing and having two free segments of unequal tension each engaging one of said jaws to urge abutting engagement therebetween, the segment thereof having the greater tension being arranged to rest against a stop when said jaws are abutting and said parting line is in alignment with said opening;
 and means for ejecting said fishing weight from said mold after casting.

4. The apparatus of claim 3 wherein said means for ejecting said fishing weight comprises:
 a rodlike member arranged longitudinally parallel said abutting surfaces and movable in and out of wedging engagement with said notch for wedging said jaws out of abutting engagement and being further movable toward said eyelet formed by said mold for ejecting said fishing weight through said opening.

5. The apparatus of claim 4 wherein:
 said rodlike member forms the free end of a generally U-shaped handle whose other end is secured to said housing, said handle being spring urged to maintain said rodlike member out of engagement with said jaws except during actuation, said actuation being accomplished manually by squeezing said handle.

6. Apparatus for forming fishing weights comprising:
 a housing having included in a thickened portion of a wall thereof a conical opening for receiving molten material therethrough and for forming the body portion of a fishing weight;
 a split mold contained in said housing adapted to form an eyelet of said fishing weight, said split mold comprising jaws having a portion of adjacent surfaces thereof beveled to form a V-shaped notch at the parting line therebetween when said jaws are in abutting engagement;
 a stop;
 a bent spring secured intermediate its ends to said housing and having two free segments of unequal tension each engaging one of said jaws to urge abutting engagement therebetween, the segment thereof having the greater tension being arranged to rest against the stop when said jaws are abutting and said parting line is in alignment with said opening in said housing;
 a rodlike member arranged longitudinally parallel said abutting surfaces and movable in and out of wedging engagement with said notch for wedging said jaws out of abutting engagement and being further movable against said eyelet formed by said mold for ejecting said fishing weight from said mold, said rodlike member forming the free end of a generally U-shaped handle whose other end is secured to said housing, said handle being spring-urged to maintain said rodlike member out of engagement with said jaws except during actuation, said actuation being accomplished manually by squeezing said handle.

References Cited by the Examiner

UNITED STATES PATENTS

| 159,397 | 2/1875 | Dimock | 22—92 |
|---|---|---|---|
| 828,625 | 8/1906 | Ogg | 81—43 |
| 2,367,962 | 1/1945 | Reibold et al. | 22—94 |
| 3,137,894 | 6/1964 | Butler et al. | 18—5.7 |

J. SPENCER OVERHOLSER, *Primary Examiner.*

R. D. BALDWIN, *Assistant Examiner.*